United States Patent [19]

Skantar

[11] 3,967,809

[45] July 6, 1976

[54] LINEAR FLUIDIC ACTUATOR

[76] Inventor: Michael J. Skantar, P.O. Box No. 13, Pleasant Unity, Pa. 15676

[22] Filed: Oct. 3, 1974

[21] Appl. No.: 511,943

[52] U.S. Cl. ................................ 251/61; 92/92; 138/127; 251/61.2
[51] Int. Cl.² ................................ F16K 31/126
[58] Field of Search ............... 91/167 R; 92/47, 48, 92/64, 91, 92; 138/123, 124, 125, 126, 127; 251/61, 61.1, 61.2, 61.3, 61.4, 61.5

[56] References Cited
UNITED STATES PATENTS

| | | | |
|---|---|---|---|
| 798,988 | 9/1905 | Wilkins | 251/61 |
| 1,651,022 | 11/1927 | Fulton | 138/127 |
| 2,991,763 | 7/1961 | Marette | 91/167 R |
| 3,284,964 | 11/1966 | Saito | 91/167 R |
| 3,324,895 | 6/1967 | Johnson | 92/47 |
| 3,580,289 | 5/1971 | James, Jr. et al. | 138/127 |
| 3,618,638 | 11/1971 | Yarlott et al. | 92/92 |
| 3,645,173 | 2/1972 | Yarlott | 92/92 |
| 3,725,167 | 4/1973 | Love et al. | 138/127 |

FOREIGN PATENTS OR APPLICATIONS 674,031  6/1952  United Kingdom .................. 251/61

Primary Examiner—Martin P. Schwadron
Assistant Examiner—George L. Walton
Attorney, Agent, or Firm—Buell, Blenko & Ziesenheim

[57] ABSTRACT

The specification describes a linear fluidic actuator comprising a plurality of expansible tubes or tubular envelopes closed at opposite ends and coupled in a chain and arranged to have one end of the chain anchored while the other end is adapted to move and exert a tensile force upon inflation of one or more of the tubes, as by compressed air, into a circular diameter, in accordance with the degree of contraction of the chain of tubes. A variation of the actuator utilizes the contracting force of the chain of tubes to effect compression of one or more caged springs, the compressive force of which is illustratively shown and described as actuating a floating member to operate a valve device of the gate or plug type. Also disclosed are modifications utilizing a plurality of parallel-related chains of tubes and tubes expansible to different diameters for utilizing different inflating pressures.

14 Claims, 8 Drawing Figures

LINEAR FLUIDIC ACTUATOR

This invention relates to linear fluidic actuators of the type comprising expansible envelopes activated linearly due to change of configuration in consequence of pressurization by fluid such as air.

U.S. Pat. Nos. 3,618,638 and 3,645,173 disclose fluid actuators comprising an ellipsoidal envelope which, upon pressurization, contracts in the line of its major axis to a degree proportional to the degree of pressurization. This type of fluid actuator is limited in its application to mechanisms requiring relatively low forces and relatively short travel distances.

It is an object of this invention to provide a fluidic actuator capable of exerting very high linear forces of the order of several thousand pounds with relatively low activating fluid pressures of the order of 100 lbs. per square inch.

It is another object of this invention to provide a linear fluidic actuator capable of sustaining high fiber stresses of the order of 25,000 p.s.i.

It is a further object of this invention to provide a linear fluidic actuator capable of great flexibility of control and susceptible of small increments of travel while exerting high linear forces.

It is a further object of this invention to provide one application of my linear fluidic actuator in the form of a gate or plug valve of the type capable of controlling flow of fluid in a pipe line of the order of 40 inches in diameter.

In the attainment of the above objectives, I provide a linear fluidic actuator comprising a plurality of tubes or tubular envelopes closed at the ends and connected serially in a chain and a system for individually or collectively pressurizing the envelopes to effect incremental linear contraction of the chain of tubular envelopes.

More specifically I provide a linear fluidic actuator device comprising a plurality of coil springs caged between a fixed abutment and a floating abutment, movement of the latter abutment being translated to a device to be actuated and the coil springs being pre-stressed by pressurization of one or more of the tubular envelopes of the linear actuator of the preceding paragraph to provide a normal activating force.

I further provide a gate or plug valve device, employing the aforesaid linear fluidic actuator device.

I further provide a system, including a manifolding arrangement for the depressurization lines of the tubular envelopes of the aforesaid linear fluidic actuator, for individually and collectively controlling pressurization and depressurization of the tubular envelopes.

A preferred embodiment of my linear fluidic actuator is illustratively shown in the accompanying drawings and described hereinafter in connection with a gate or plug valve device and a control system therefor, wherein.

Figure 8:
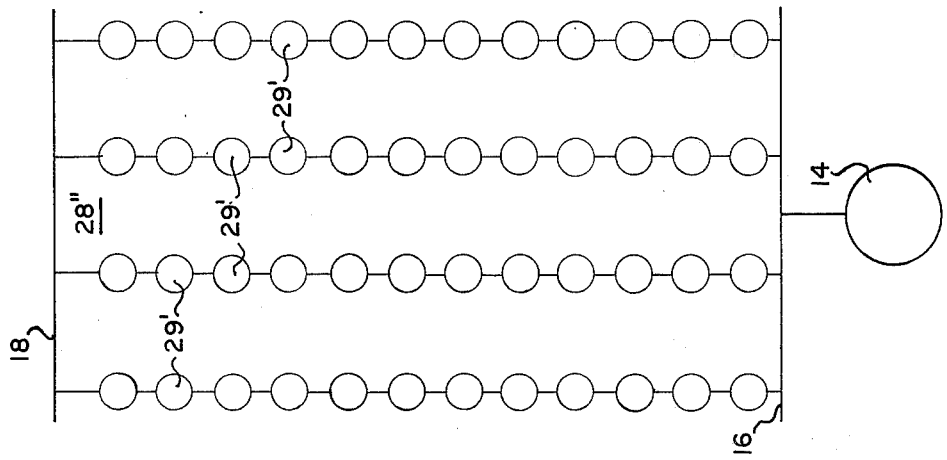
Figure 7:
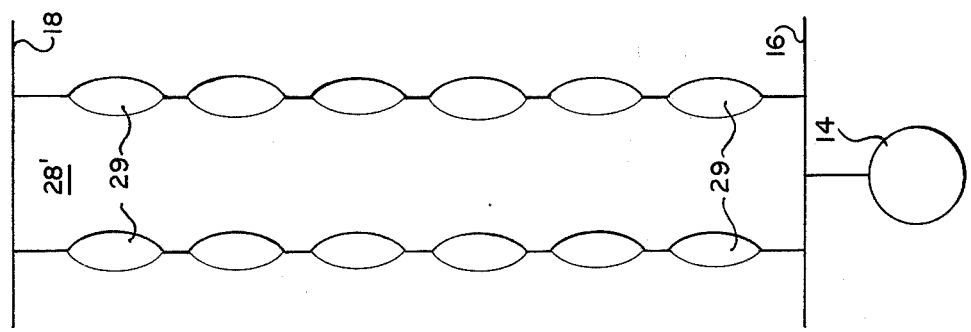

FIG. 7 is a diagrammatic view, showing a parallel arrangement of two rows of tubular envelopes in deflated condition, illustrative of a linear fluidic actuator adapted to provide high forces with lower operating fluid pressure; and FIG. 8 is a diagrammatic view, showing a parallel arrangement of four rows of tubular envelopes, shown as fully inflated to maximum circular diameters, illustrating a linear fluidic actuator utilizing lesser inflation pressures and consequently lesser fabric stresses, and capable of small step function increments of travel or continuous incremental travel.

Figure 1:
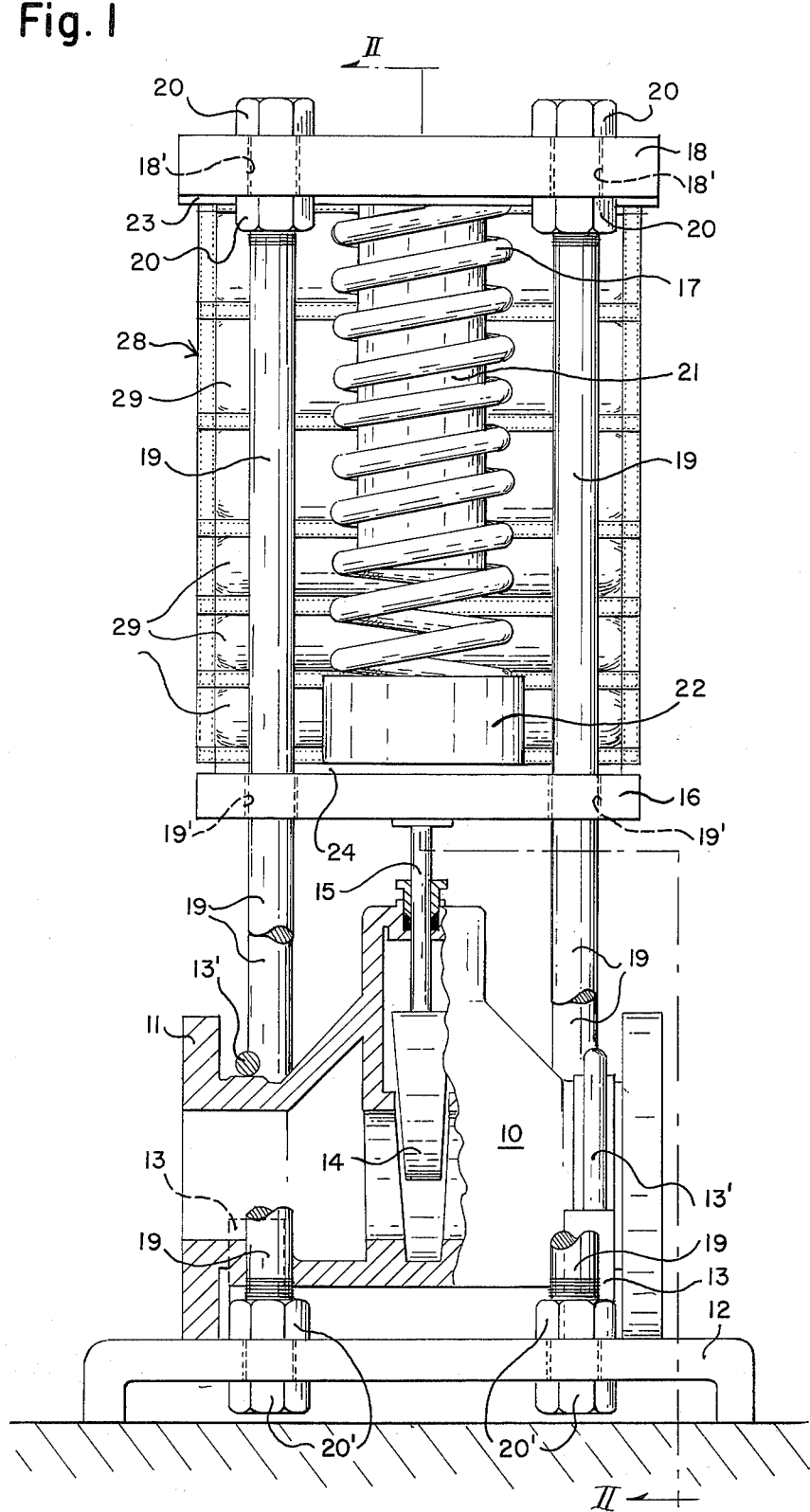
FIG. 1 is an elevational view, partly in section, showing the essentials of my linear fluidic actuator as applied to a gate valve to impart a fail-safe characteristic thereto.
Figure 2:
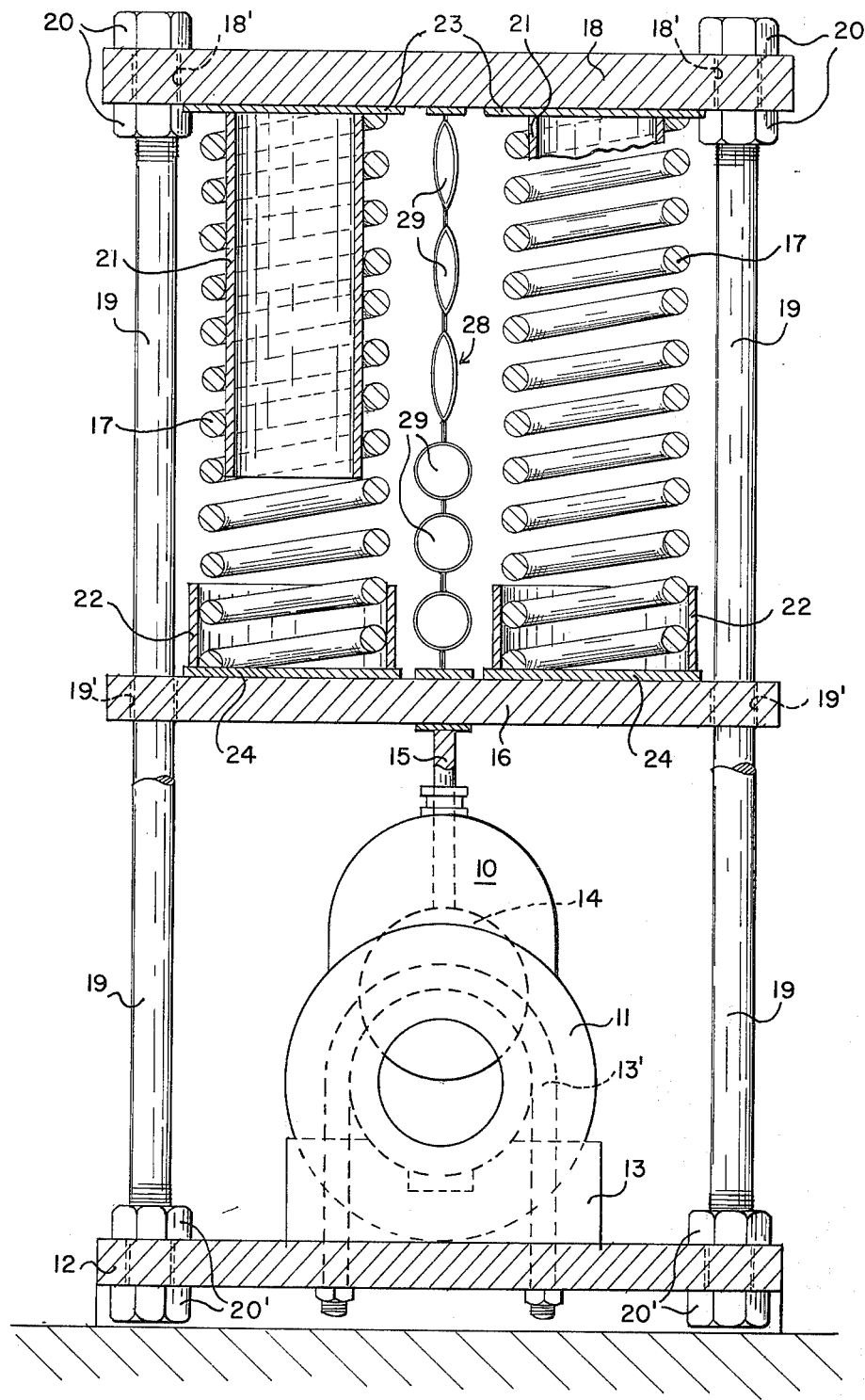
FIG. 2 is an elevational sectional view, taken on the line II—II of FIG. 1, showing further details of the linear fluidic actuator and of the gate valve to which it is applied.

Referring to the drawings, especially FIGS. 1 and 2, it will be seen that the gate valve 10 shown therein comprises a valve body 11 anchored to a foundation base 12, by a saddle support 13 and anchor rings 13' surrounding the body 11 at each end.

The tapered gate valve element 14 is connected by a stem 15 to a floating rectangular plate member 16 that is biased by a pair of coil springs 17 caged between member 16 and a rectangular top plate member 18. Plate member 18 has a pair of through holes 18' on each side through which extend tension support rods or bolts 19 secured to plate member 18 by nuts 20 on each side thereof. Top plate member 18 is anchored to the foundation base 12 by rods 19 and pairs of securing nuts 20'.

The floating plate member 16 has a pair of guide holes 19' on each side through which the corresponding tension rods 19 loosely extend, thereby serving to guide the movement of the plate member 16.

It will be noted that each of the pair of coil springs 17 is retained in position between the top and floating plate members by a telescoping pair of cylindrical guide members 21 and 22, which are attached to plate guide members 23 and 24 that are in turn secured to the top and floating plate members. The upper cylindrical guide members 21 extend coaxially through the coil springs 17 and serve to limit the degree of compression of the springs by engagement with the members 24 of the floating plate member 16 and thus determine the ultimate opening travel of the valve element 14.

Extending between and suitably secured tautly at its opposite ends to the top plate member 18 and floating plate member 16, respectively, is a linear fluidic actuator 28 embodying my invention. Actuator 28 comprises a plurality, illustratively shown as six in number, of expansible tubular envelopes or tubes 29, three of which are shown in FIG. 2 as inflated into full circular cross-section and three of which are shown in their deflated form.

Figure 3:
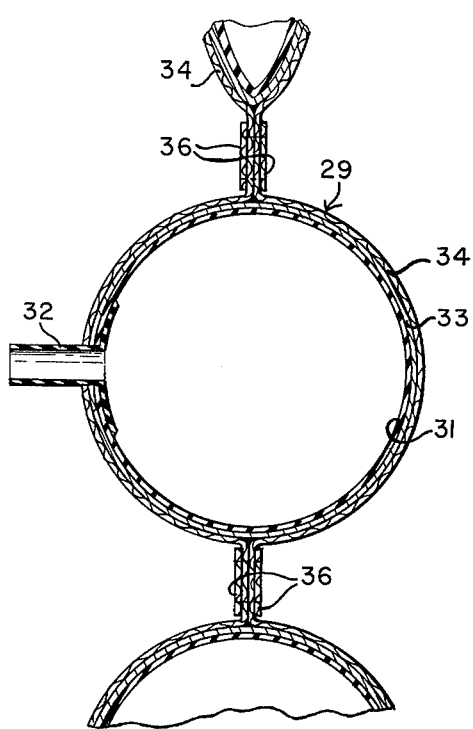
FIGS. 3, 4 and 5 are fragmentary enlarged views, showing various details of construction of the tubular envelopes in the linear fluid actuator.
Figure 4:
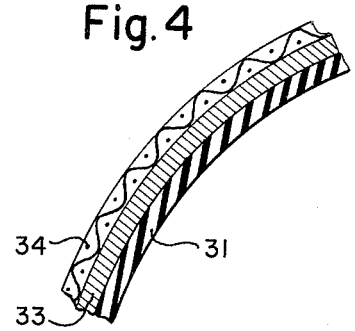
Figure 5:
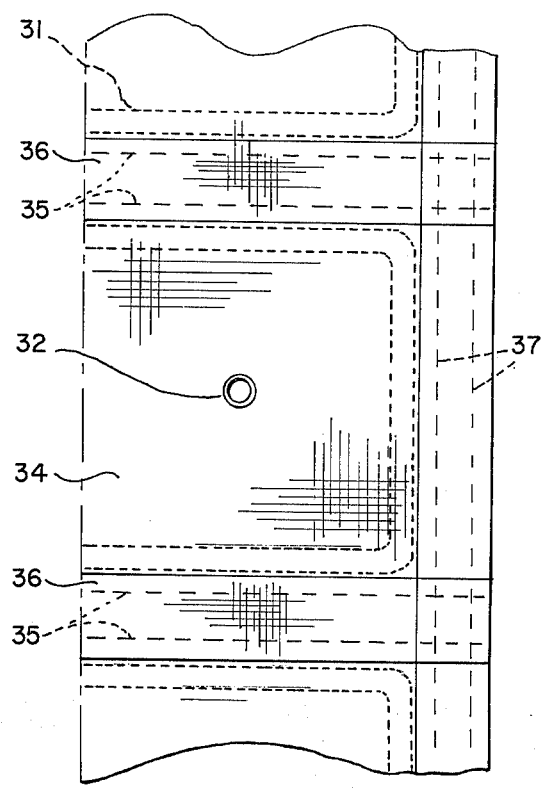

Referring more particularly to FIGS. 3, 4 and 5, it will be seen that each tube 29 is made up of an inner tube 31 of elastomeric material having a stem 32 through which fluid under pressure, such as compressed air, is supplied and exhausted for inflating and deflating the tube 31. The inner tube 31 is flat when deflated but expands into a circular contour in cross-section when fully inflated, as shown in FIG. 3. The inner tubes 31 are of a suitable length, such as 17.5 inches, and the ends of the tubes are closed by circular discs of elastomeric material molded integrally with the cylindrical body portion of the inner tubes.

The inner tubes 31 are inserted in sleeves 33 of high strength fabric, such as Dacron sail cloth, closely conforming to the circular outer diameter of the inner tubes when fully inflated and reinforcing the inner tube to withstand the inflating fluid pressure.

The whole assembly of tubes is connected into a chain from top to bottom by a pair of sheets 34 of high strength fabric, such as stainless steel woven wire fabric, capable of withstanding a unit stress in tension of 25,000 p.s.i., disposed on opposite sides and having the space between the tubes 29 double stitched at 35 as shown in FIG. 5. Desirably, an additional reinforcing strip 36 of high strength fabric, such as stainless steel woven wire fabric, is disposed at each side in the space between the tubes and secured in place by the double stitching at 35.

The sheets 34 of woven wire fabric and the sleeves 33 of sail cloth extend beyond the ends of the inner tube 31 and, in the flat condition of the inner tubes 31, are double stitched together at 37, as shown in FIG. 5.

The chain length of the assembly of tubes 29 making up the actuator 28 is such as to be tautly stretched in a vertical line, with all tubes deflated, in the closed position of valve element 14. In the closed position of valve element 14, coil springs 17 are compressed, that is, pre-loaded to a fraction of the full compression force of springs with the valve element in full open position. By way of example, with springs 17 rated at 185 pounds per inch of compression, a pre-load compression of three inches for both springs would cause exertion of a force of 1,110 pounds acting to hold the valve element 14 in its closed position. Assuming further that valve element 14 requires a travel of 6 inches to reach its full open position, the additional compression of the springs 17 builds up a force of 3,330 pounds acting to return the valve element to closed position.

In order to activate the actuator, a source of fluid pressure, such as compressed air, in a charged reservoir 40 (FIG. 6) at a pressure of 100 p.s.i. may be employed. Assuming that all tubes 29 of the actuator 28 are deflated and stretched taut with the valve element 14 in closed position, inflation of one of the tubes 29 to a full pressure of 100 p.s.i. will expand it to the full circular contour. With an expanded circular diameter of 2 inches, the length of the actuator 28 is contracted or shortened 1.14 inches, namely one-half the circumference of the inner tube 31 less the diameter. This means that the valve element is raised or opened a distance of 1.14 inches and that the two springs 17 exert a total biasing force equivalent to (3. + 1.14) 185 × 2 or 1532 pounds. Assuming a 0.46 inch recessed rim on the gate of the valve element, conceivably the assumed 1.14 inch opening travel of valve element 14 may not provide more than a crescent shaped opening.

Assuming that all the tubes 29 of actuator 28 are dimensioned similarly to that above described, full inflation of all six tubes will produce more than a full opening travel of valve element 14 of 6 × 1.14 or 6.84 inches. This means that the contracting force exerted by the tubes 29 due to inflation will be the pressure (100 lbs. p.s.i.) acting on the projected area (17.5 × 2 = 35 in.$^2$) of the tubes or approximately 3500 lbs. thus, the total force of the coil springs acting to close valve element 14 is 9.46 × 185 × 2 = 3500 pounds.

Figure 6:
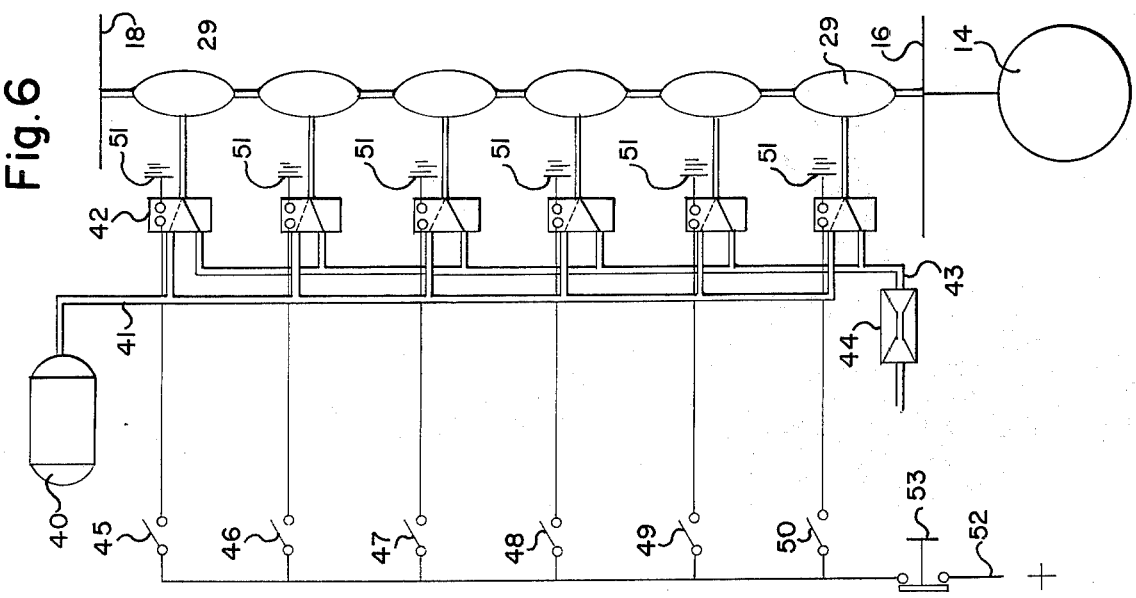
FIG. 6 is a diagrammatic view of the circuitry by which pressurization and depressurization of the tubular envelopes of the linear fluidic actuator are individually and collectively accomplished.

FIG. 6 illustrates a system of control for inflating and deflating the tubes 29 of actuator 28. The system shown comprises a manifold supply pipe line 41 connected to the reservoir 40 which is suitably maintained charged at a pressure such as 100 p.s.i. by a compressor (not shown). A suitable two-position magnet valve 42 is provided for each tube 29, effective when energized to establish communication, represented by the broken line, between the supply line 41 and the corresponding tube 29 to effect inflation thereof. When each magnet valve 42 is deenergized, the supply communication therethrough is interrupted and the corresponding tube 29 is exhausted, and thereby deflated, via an exhaust communication, represented by the solid line, between the tube and an exhaust manifold pipe line 43. The exhaust line 43 is preferably connected to atmosphere through a restricted orifice device 44, thus controlling the rapidity with which the tubes are deflated and thereby assuring an appropriately slow closing action of the valve element 14.

The magnet valves 42 are individually controlled by different normally open switches 45, 46, 47, 48, 49, and 50 in a circuit grounded at 51 and connected to a positive or plus terminal at 52. The circuit extends via a normally-closed switch 53 which when opened serves to interrupt the power supply to all magnet valves at once.

In such case, the restricted orifice device 44 is especially desirable in order to assure appropriately slow deflation of the tubes 29 and a correspondingly slow closing action of valve element 14.

FIG. 7 shows diagrammatically an actuator 28' in which two rows or series of six tubes 29 are arranged in parallel between the top frame member 18 and the floating frame member 16. This arrangement of tubes 29 is advantageous in that it enables operation at a fluid pressure which is one-half that for a single series of tubes, for example, at 50 p.s.i. instead of 100 p.s.i. It will be seen that such is the case because once the tubes are fully inflated to circular cross-section a further increase in inflation pressure is ineffective to cause further contraction translated into valve element travel. Thus, assuming full inflation of the tubes 29 at 50 p.s.i., the total force exerted by two series of tubes in parallel to compress the coil springs 17 will equal that exerted by one series of tubes operated at 100 p.s.i. since the pressure area of tubes subject to 50 p.s.i. is twice that subject to 100 p.s.i. By thus sharing the tensile load between two parallel series of tubes instead of using only one series of tubes, it is possible to omit the stainless steel woven wire fabric 34, shown in FIGS. 1 and 2 as a connection between the tubes, and substitute less expensive sheets of polyester, such as Dacron sail cloth capable of withstanding unit tension forces developed at the lesser operating fluid pressures.

FIG. 8 shows diagrammatically an actuator 28" utilizing four series of twelve tubes 29' in parallel, the tubes being smaller than tubes 29, for example one inch in diameter when fully inflated, as shown, compared to two inches. Because of the reduced pressure area of the tubes 29', equivalent operating fluid pressures produce less fabric stress than in the larger diameter tubes 29. Moreover, by utilizing twelve tubes 29' inflatable to one-half the diameter of tubes 29, it is possible to produce the same travel of valve element 14, namely six inches, as is produced by inflating six tubes 29. It will be apparent also that utilizing a higher number of tubes of lesser diameter enables smaller step function increments of travel for the full valve element travel.

Heretofore, the operation of the gate valve 10 has been described as under manual control. It will be understood however, that various types of automatic control systems may be utilized to control the individual or collective inflation and deflation of the tubes of an actuator. It will be apparent that failure of the electric power supply for the magnet valves 42 of the system shown in FIG. 6 will necessarily result in concurrent deflation of all inflated tubes and the consequent actuation of the gate valve element 14 to closed position by the tremendous force of coil springs 17. Similarly, loss of fluid pressure from the pressure supply system or due to leakage from the tubes 29 or 29' will result in automatic closure of the gate valve element 14.

While the actuators 28, 28' and 28" have been shown and described for use with gate valves, it should be apparent that, by reason of the simplicity with which high forces are obtained and positive and precise travel from zero to several meters, their relatively low cost, and their fail-safe characteristics, they may be utilized for other purposes and in other applications.

What I claim and desire to secure by Letters Patent is:

1. A linear fluidic actuator comprising a tubular envelope closed at opposite ends and inflatable from a flat deflated condition to a certain maximum circular diameter, and a flexible inextensible tension means of fixed length carrying said tubular envelope in a position such that the longitudinal axis of the inflated envelope is transverse to the line of action of said tension means, whereas the diametral axis of the deflated envelope lies in a plane paralleling said line of action, one end of said tension means being fixed in position and the other end being movable linearly toward the fixed end responsively to inflation of the tubular envelope from a flat to a circular configuration.

2. A linear fluidic actuator according to claim 1, and further comprising a fixed member, a movable member, spring means caged between said fixed member and said movable member, and wherein the said one end of the tension means is anchored to said fixed member and the opposite end of the tension means is connected to said movable member.

3. A linear fluidic actuator according to claim 1, wherein said tubular envelope comprises an inner tube of elastomeric material closed at both ends and being of uniform diameter throughout its length, a sleeve of high strength fabric closely surrounding the length of said inner tube and stitched together at the ends of the tube, for limiting inflation of said inner tube to a certain maximum circular area and wherein said tension means comprises a pair of high tensile strength woven sheets disposed on opposite sides of said tube in conformation to the configuration of said tube and means securing said woven sheets together, and means anchoring one end of said woven sheets so that inflation of said inner tube to the circular configuration effects a contraction in the overall length of said pair of woven sheets resulting in corresponding movement of the free end thereof.

4. A linear fluidic actuator according to claim 3, wherein said high tensile strength woven sheets comprise stainless steel woven wire fabric.

5. A linear fluidic actuator comprising a plurality of tubular envelopes closed at opposite ends and inflatable individually and collectively with fluid under pressure from a flat deflated condition to a certain maximum cross sectional area circular in form, and flexible tension means of fixed length carrying said tubular envelopes serially in spaced parallel relation with the longitudinal axes of said envelopes being transverse to the line of action of said tension means, one end of said tension means being anchored in a fixed position and the other end being activated linearly toward said one end in accordance with the contraction of said tension means in consequence of inflation of said tubular envelopes toward a circular configuration.

6. A linear fluidic actuator according to claim 5, wherein each of said tubular envelopes comprises:
   a. an inner tube of elastomeric material closed at both ends, and
   b. a sleeve of high strength fabric closely surrounding the length of the inner tube and stitched together at the ends of the tube for limiting inflation of said inner tube to a certain maximum circular area, and wherein said tension means comprises a pair of high tensile strength woven sheets disposed on opposite sides of said inner tubes and sleeves and conformed to the configuration of said tubes, and means securing said woven sheets together between adjacent tubes and at opposite ends, so that inflation of said tubes to the circular configuration induces a contraction in the overall length of said pair of woven fabric sheets resulting in corresponding movement of the said other end of the said woven sheets toward said one end thereof.

7. A linear fluidic actuator according to claim 5, and further comprising a fixed member, a movable member, spring means caged between said fixed member and said movable member, and wherein the said one end of the tension means is anchored to said fixed member and the opposite end of the tension means is connected to said movable member.

8. A fluid pressure controlled operating device, comprising a pair of spaced abutments, one of which occupies a fixed position and the other of which is movable relative to said one abutment, coil spring means interposed under compression between said abutments and acting to bias said movable abutment away from the fixed abutment, and inflatable means comprising a plurality of end-closed tubes of elastomeric material arranged in a row in parallel relation and a sleeve of woven fabric surrounding each of said tubes to limit inflation thereof to a certain maximum circular cross-sectional area, said inflatable means being tautly stretched in flat deflated condition between said abutments in which condition it sustains the expansion force of said spring means and effective when inflated from a flat deflated condition to an inflated circular cross-section to exert a compression force on said spring means and a corresponding movement of said movable abutment toward said fixed abutment.

9. A fluid pressure controlled operating device according to claim 8, wherein a pair of inextensible woven fabric sheets is stitched together with the said tubes therebetween and substains the compression force of said spring means active upon expansion of said tubes individually and collectively.

10. A fluid pressure controlled operating device, comprising a pair of spaced abutments, one of which occupies a fixed position and the other of which is movable relative to said one abutment, coil spring means interposed under compression between said abutments and acting to bias said movable abutment away from the fixed abutment, inflatable means comprising a plurality of spaced rows of parallel tubes of elastomeric material, each tube having therearound a sleeve of woven fabric to limit inflation of the tube to a certain maximum circular area in cross section, and a pair of sheets of woven wire fabric means disposed at a right angle to said tubes supports and connects the tubes of each row tautly between said abutments, indivudual and collective inflation of corresponding tubes of each row simultaneously into circular cross-section creating a step-by-step contracting force active through said sheets of fabric means effective to overcome and compress said spring means.

11. A gate valve having a valve body, a gate valve element movable between a full open and a closed position, and an operating stem for said valve element projecting out of said body, wherein the improvement comprises an operator for said valve element comprising a pair of spaced abutments one of which is fixed relative to said valve body and the other of which is movable relative thereto to which said operating stem is secured, spring means compressed between the said pair of abutments and biasing said movable abutment and said stem to move said valve element to closed position, and tubular elastomeric means interposed between said fixed and movable abutments and inflatable from a flat deflated condition to a certain maximum circular cross-sectional area, said tubular elastomeric means having its longitudinal axis at a right angle to the line of action of said spring means, and tension means comprising a pair of inextensible sheets of fabric material secured together and supporting said tubular elastomeric means therebetween, said sheets having their opposite ends connected to said pair of abutments respectively, said tubular elastomeric means being effective when fully inflated to circular form to act through said tension means to shorten the linear distance between said abutments and thereby effect opening travel of said valve element in opposition to said spring means.

12. A gate valve according to claim 11, wherein said valve body and said fixed abutment are anchored to a common base and the anchoring means for said fixed abutment constitutes a guide means for said movable abutment.

13. A gate valve according to claim 11, wherein said tubular elastomeric means when deflated is tautly stretched in flat condition between said abutments and when inflated expands to a certain maximum circular cross-section whereby to exert a linearly contracting force through said tension means to shorten the distance between the said abutments and compress said spring means, thereby correspondingly effecting movement of said movable abutment and opening travel of said gate valve element.

14. A gate valve according to claim 11, wherein said tubular elastomeric means comprises a plurality of end-closed tubes of uniform diameter throughout their length arranged in parallel spaced relation, whereby expansion of said tubes individually and collectively to a circular cross-section produces a force of contraction effective through said pair of fabric sheets to compress said spring means and cause opening travel of said gate valve element.

* * * * *